US010212535B2

(12) United States Patent
Mishra et al.

(10) Patent No.: US 10,212,535 B2
(45) Date of Patent: Feb. 19, 2019

(54) MULTI-RAT NODE USED FOR SEARCH AND RESCUE

(71) Applicant: Parallel Wireless, Inc., Nashua, NH (US)

(72) Inventors: Rajesh Kumar Mishra, Westford, MA (US); Steven Paul Papa, Windham, NH (US); Sridhar Donepudi, Nashua, NH (US); Kaitki Agarwal, Westford, MA (US)

(73) Assignee: Parallel Wireless, Inc., Nashua, NH (US)

(*) Notice: Subject to any disclaimer, the term of this patent is extended or adjusted under 35 U.S.C. 154(b) by 0 days.

(21) Appl. No.: 14/454,670

(22) Filed: Aug. 7, 2014

(65) Prior Publication Data

US 2015/0045063 A1    Feb. 12, 2015

Related U.S. Application Data

(60) Provisional application No. 61/863,135, filed on Aug. 7, 2013, provisional application No. 61/896,719, filed on Oct. 29, 2013.

(51) Int. Cl.
*H04W 4/02* (2009.01)
*H04W 16/28* (2009.01)
(Continued)

(52) U.S. Cl.
CPC ............ *H04W 4/02* (2013.01); *H04W 16/28* (2013.01); *H04W 4/90* (2018.02); *H04W 84/18* (2013.01)

(58) Field of Classification Search
CPC ................................ H04W 4/02; H04W 16/28
(Continued)

(56) References Cited

U.S. PATENT DOCUMENTS 6,141,558 A * 10/2000 Chen .................. G01S 3/58
                                                    455/440
6,275,186 B1 * 8/2001 Kong .................. G01S 5/10
                                                    342/457

(Continued)

FOREIGN PATENT DOCUMENTS

WO    2011092698 A1    8/2011
WO    2011093900       8/2011

(Continued)

OTHER PUBLICATIONS

"Incorporation of Common, In-Coverage, and Out of Coverage Requirements," Qualcomm, 3rd Generation Partnership Project, 3GPP TSG-SA WG1 Meeting #61, Feb. 2, 2013, retrieved from http://www3gpp.org/ftp/tsg_sa/WG1_serv/TSGS1_61_Prague/Docs/.

(Continued)

*Primary Examiner* — Michael R Neff
(74) *Attorney, Agent, or Firm* — Michael Y. Saji; David W. Rouille

(57) ABSTRACT

Systems and methods are presented for using a mobile multi-radio access technology (multi-RAT) device for locating an individual, for example, in a search-and-rescue application. The multi-RAT device may permit the individual's cell phone to attach to the mobile multi-RAT device, and then may use a directional antenna to locate the individual. Various embodiments of such a device are described.

13 Claims, 6 Drawing Sheets

(51) Int. Cl.
*H04W 84/18* (2009.01)
*H04W 4/90* (2018.01)

(58) Field of Classification Search
USPC .................................................. 455/456.2
See application file for complete search history.

(56) References Cited

U.S. PATENT DOCUMENTS

| | | | |
|---|---|---|---|
| 8,019,331 | B2 | 9/2011 | Khetawat et al. |
| 8,358,577 | B1 | 1/2013 | Khanka et al. |
| 8,385,332 | B2 | 2/2013 | Aggarwal |
| 8,386,082 | B2 | 2/2013 | Oswald |
| 8,521,172 | B2 | 8/2013 | Rosenau |
| 8,526,910 | B2 | 9/2013 | Messerly |
| 8,526,961 | B2 | 9/2013 | Sanders et al. |
| 9,167,623 | B2 | 10/2015 | Ikeda et al. |
| 2004/0063451 | A1 | 4/2004 | Bonta et al. |
| 2004/0160363 | A1 | 8/2004 | Powers et al. |
| 2005/0073438 | A1* | 4/2005 | Rodgers .................. G08G 1/161 340/944 |
| 2005/0153725 | A1 | 7/2005 | Naghian et al. |
| 2006/0286961 | A1 | 12/2006 | Levitan |
| 2008/0070593 | A1 | 3/2008 | Altman et al. |
| 2008/0194246 | A1* | 8/2008 | Klein .................... H04W 8/082 455/422.1 |
| 2008/0261602 | A1 | 10/2008 | Livneh |
| 2008/0299899 | A1 | 12/2008 | Wolfe |
| 2009/0005005 | A1 | 1/2009 | Forstall et al. |
| 2009/0040985 | A1 | 2/2009 | Barnawi et al. |
| 2009/0312022 | A1 | 11/2009 | Viorel et al. |
| 2010/0234071 | A1 | 9/2010 | Shabtay et al. |
| 2010/0260146 | A1 | 10/2010 | Lu |
| 2011/0065448 | A1* | 3/2011 | Song .................... H04B 7/0632 455/452.2 |
| 2011/0090869 | A1 | 4/2011 | Tian et al. |
| 2011/0235568 | A1 | 9/2011 | Esteves et al. |
| 2012/0033603 | A1 | 2/2012 | Seo et al. |
| 2012/0106464 | A1 | 5/2012 | Ma et al. |
| 2012/0115430 | A1 | 5/2012 | Hawkes et al. |
| 2012/0209773 | A1 | 8/2012 | Ranganathan |
| 2012/0281594 | A1 | 11/2012 | Stewart et al. |
| 2013/0059585 | A1 | 3/2013 | Giloh |
| 2013/0065585 | A1* | 3/2013 | Pelletier .................. H04W 4/02 455/435.1 |
| 2013/0084873 | A1 | 4/2013 | Sharony et al. |
| 2013/0122904 | A1 | 5/2013 | Lee et al. |
| 2013/0184000 | A1 | 7/2013 | Cook et al. |
| 2013/0195012 | A1 | 8/2013 | Laitila et al. |
| 2013/0260785 | A1 | 10/2013 | Shakespeare et al. |
| 2013/0278416 | A1* | 10/2013 | Button .................. G01S 5/0072 340/539.13 |
| 2013/0308470 | A1 | 11/2013 | Bevan et al. |
| 2014/0036807 | A1* | 2/2014 | Huang ................ H04W 76/021 370/329 |
| 2014/0141799 | A1* | 5/2014 | Rousu .................. G01S 19/235 455/456.1 |
| 2014/0155019 | A1 | 6/2014 | Schwartz et al. |
| 2014/0295879 | A1 | 10/2014 | Yang |

FOREIGN PATENT DOCUMENTS

| | | |
|---|---|---|
| WO | 2011137118 A1 | 11/2011 |
| WO | WO2011157486 | 12/2011 |
| WO | 2012120519 A1 | 9/2012 |

OTHER PUBLICATIONS

"Discussion on Relaying for D2D Proximity Services," ETRI, 3rd Generation Partnership Project, 3GPP TSG-RAN WG2 Meeting #83, Aug. 9, 2013, retrieved from http://www.3gpp.org/ftp/tsg_ran/WG2_RL2/TSGR2_83/Docs/.

"Fs_ProSe: Public Safety Use Cases," Alcatel-Lucent, NIST, Nokia Siemens Networks, U.S. Cellular, 3rd Generation Partnership Project, 3GPP TSG-SA WG1 Meeting #56, Nov. 7, 2011.

"Update of Solution R1," CATT, CATR, 3rd Generation Partnership Project, SA WG2 Meeting #100, Nov. 12, 2013, retrieved from http://www.3gpp.org/ftp/Meetings_3GPP_SYNC/SA/SA2/Docs/.

"UE Relay for Public Safety," HTC, 3rd Generation Partnership Project, SA WG2 Meeting S2 #98, Jul. 9, 2013, retrieved from http://www.3gpp.org/ftp/tsg_sa/WG2_Arch/TSGS2_98_Valencia/Docs/.

* cited by examiner

MULTI-RAT NODE USED FOR SEARCH AND RESCUE

CROSS-REFERENCE TO RELATED APPLICATIONS

This application claims the benefit of priority under 35 U.S.C. § 119(e) of U.S. Provisional Patent Application No. 61/863,135, filed Aug. 7, 2013, and No. 61/896,719, filed Oct. 29, 2013, each of which are incorporated by reference herein in their entirety. In addition, this application incorporates the following applications in their entirety by reference: U.S. Provisional Patent Application No. 61/705,440, entitled "Multi-Access and Backhaul Wireless Systems and Methods" filed on Sep. 25, 2012; to U.S. Provisional Patent Application No. 61/784,002 entitled "Method of Dynamically Altering Operational Parameters of a Base Station," filed on Mar. 14, 2013; and to U.S. Provisional Patent Application No. 61/812,119 entitled "Heterogeneous Mesh Network and a Multi-RAT Node Used Therein," filed on Apr. 15, 2013, U.S. patent application Ser. No. 13/889,631 entitled "Heterogeneous Mesh Network and a Multi-RAT Node Used Therein," filed on May 8, 2013, and U.S. patent application Ser. No. 14/211,355, entitled "Methods of Incorporating an Ad Hoc Cellular Network into a Fixed Cellular Network," filed Feb. 18, 2014.

FIELD

The present application relates to multi-RAT nodes used for search and rescue missions. These multi-RAT nodes may optionally be part of mesh networks, wireless mesh networks, heterogeneous mesh networks, or self-organizing networks,

BACKGROUND

When an individual is lost or trapped in a destroyed building, he or she rarely has cell phone coverage. The reasons for lack of cell phone coverage are many. For example, in remote areas where hikers, skiers, boaters, and the like typically become lost, there is often no network coverage. When a building has been destroyed by, for example, earthquake, fire, missile, grenade, bomb, hurricane, and the like, there is often attendant damage to portions of the network. Additionally, in the situation where a person is trapped within a building or under snow, they may not have cell phone coverage because of signal penetration issues.

Although it would be ideal to be able to locate lost or trapped people by making a connection with their cell phone, this has not been done in the past because you cannot bring the tower, so to speak, to the lost/trapped individual. With the evolution of small cells, however, there is more mobility for "the tower." It is therefore desirable to use a mobile eNodeB to locate a lost or trapped individual.

This provisional application builds upon the architecture of a multi-RAT node that can be a mobile eNodeB used to locate trapped or lost individuals. Accordingly, the disclosure of the multi-RAT node and the mesh network in which it operates is included in this application to provide additional context.

Mesh networks have existed on the fringe of the IT world since the early 1980's. See generally Power Source Online, *Mesh Networks*, Kristin Masters March 2010. http://www-.powersourceonline.com/magazine/2010/03/mesh-networks. Recent advancements in wireless technology have promoted further exploration of applications for mesh networks; they hold extensive promise for rich applications such as sensor networks. Id.

Typically, a wireless mesh network operates in a homogeneous fashion, meaning that the nodes within the network share certain traits enabling communication between them. An example of this could be a wireless mesh network operating on a Wi-Fi protocol.

Before there were wireless communications, telephone calls were placed over wired infrastructure. For wired telephony, there were different wire-line protocols, e.g., ATM and TDM, that the telephone exchanges sought to connect. One way to interconnect these disparate networks was to create gateways that could bridge together the different networks. Although these gateways provided a bridge between networks, it is not always possible for a gateway to transparently connect different nodes from different networks without needing to emulate missing features on one network or to suppress unique features from another. This gateway paradigm has been used in wireless technology as well, one example being a personal Wi-Fi portable access point that connects to the Internet using a 3G or 4G cellular data connection.

Recently, some have studied the benefits of connecting heterogeneous mesh networks. For example, You, L. et al., noted "One of the key issues is networking, which means to interconnect lots of networks, such as internet, cellular networks, wireless sensor networks (ZigBee), wireless-fidelity networks (Wi-Fi), social networks, etc." *FHMESH: A Flexible Heterogeneous Mesh Networking Platform*, You, L. et al, IEEE Sixth International Conference on Mobile Ad Hoc and Sensor Networks, Dec. 20, 2010. This paper noted that finding an efficient way to interconnect these networks is an ongoing challenge in the Cyber Physical Systems field. Id. The authors of this paper designed a "platform utilize [ing] WMN technology to interconnect heterogeneous networks, and buil[t] gateways based on SDR technology." Id.

Others who have sought to combine heterogeneous mesh networks have taken a similar tack. For example, heterogeneous interfaces for mesh networks typically consist of gateways that act as bridges between the two separate mesh networks. These gateways often employ Software Defined Radio "SDR" technologies. In effect, these gateways act as translators between the two disparate mesh networks. The individual nodes in the two disparate mesh networks, however, do not communicate directly with one another. They can only communicate via the gateway.

There are many benefits to creating heterogeneous mesh networks including increasing capacity without increasing costs. Increased capacity is desirable under many scenarios including in emergency situations such as the Sep. 11, 2001 attack on New York City, hurricanes Katrina and Sandy, and most recently, the Boston Marathon bombings. In the eleven-plus years that have transpired between the 9/11 events and the recent Boston Marathon bombing, there have been enormous advances made in wireless communications. Reliability and capacity have increased tremendously during that timeframe. But in emergency situations, cellular networks are still not able to handle the increased demand for telephone and data services.

"Toward the bottom of the list of disturbing aspects about Monday's bombing at the Boston Marathon was this: Cellular networks in the area almost immediately slowed down and, for periods of time, appeared to stop working altogether. Runners and their loved ones could not connect, and victims had trouble communicating with emergency responders. That frustrating scene has become familiar, evoking disasters from the September 11th attacks in 2001 to Hurricane Sandy in 2012. We rely on cell phones to run our lives, but they tend to be useless—or at least far from useful—when we need them most . . . . The science behind these failures in wireless connectivity isn't complicated. In every city, each mobile carrier operates hundreds or thousands of cell towers, which route calls and data to the carrier's backbone network. Each tower is designed to accommodate a set number of calls per second, per a certain geographic area. In a crisis, when everyone naturally reaches for their phone, that limit is quickly surpassed and the radios on the tower get sluggish. Mobile analyst Chetan Sharma, who estimates that a cell site can handle 150 to 200 calls per second per sector: 'We've all had the experience of a fast-busy signal. That is the network telling you, "Sorry, but your cell is overloaded. There is no more space."' Brad Stone, *Why Cell Phone Networks Fail in Emergencies*, Bloomberg Businessweek Technology, Apr. 16, 2013. http://www.businessweek.com/articles/2013-04-16/why-cell-phone-networks-fail-in-emergencies In order to increase capacity and utilize all possible resources presently available, it is desirable to create a heterogeneous mesh network where the nodes themselves provide the heterogeneity. If, for example, in the minutes after the bombing at the Boston Marathon, traffic had been rerouted, not to user's designated backhaul locations, but instead to backhaul locations that were geographically further away, e.g., Cambridge, South Boston, or Chelsea, there would have been more backhaul available on these networks to facilitate data transmission. The present invention addresses this need.

SUMMARY OF THE INVENTION

This invention discloses a heterogeneous mesh network comprised of multiple radio access technology nodes. In this heterogeneous mesh network, nodes can function dynamically, switching roles between client and server or simultaneously acting as both client and server. Moreover, these nodes can operate in a heterogeneous fashion with respect to one another. In an alternate embodiment, the invention describes a mesh network comprised of nodes operating over TV white-space. The nodes of this white-space mesh network could, in alternate embodiments, operate in a heterogeneous fashion or could dynamically switch roles between client and server. These nodes could in alternate embodiments become multi access radio technology nodes.

This invention additionally discloses self-organizing network embodiments that can be implemented in the heterogeneous mesh networks or in a white-space mesh network. In the embodiments described herein, data within the network can become agnostic in terms of its protocol. As such, embodiments of the invention also include novel methods of monitoring operational parameters within a mesh network, adjusting those operational parameters, and creating and implementing routing tables.

In additional embodiments, this invention allows the creation of unique routing protocols, in part because of the agnostic nature of the data. These routing protocols can facilitate distributed computation of network topology and/or path determination. Specifically, when agnostic data are routed within the networks created herein, it is possible to use the transmission capabilities of the multi access radio technologies for data generated from, or destined to, a wide variety of radio communication protocols, frequencies, duplexing schemes, and the like. Accordingly, additional embodiments of the present invention include methods of routing data within a heterogeneous mesh network.

DETAILED DESCRIPTION

Figure 1:
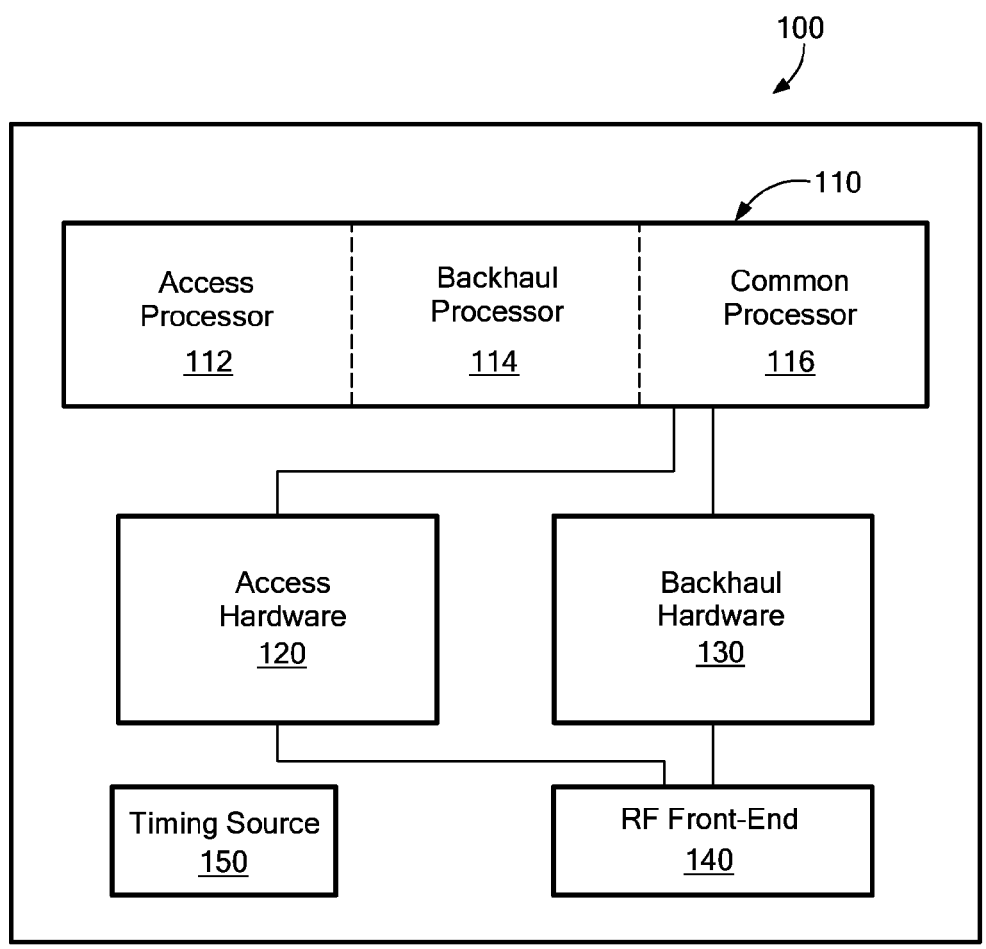
FIG. 1 is an illustration of an example multi-RAT node for deployment within a mesh network.

Although mesh networks have been deployed in the past, these networks have not contained nodes capable of: (1) operating on white-space frequencies; (2) dynamically switching roles; (3) autonomously using self-organizing network ("SON") techniques; and (4) operating within a heterogeneous environment. The present invention, and embodiments described herein include systems, networks, apparatuses, and methods realizing these capabilities.

The embodiments of this invention differ conceptually from prior art gateway paradigms because the custom designed layer stacks of this invention abstract the protocols that make each radio technology unique, thereby creating an agnostic data set that can be seamlessly routed throughout a wireless network. In other words, in the embodiments described herein, we have created an adaptation layer that spans all MAC layers so that we can bridge between heterogeneous access layers. In embodiments of this invention, individual nodes operating on different protocols, different frequencies, different hardware manifestations, or different duplexing schemes can be part of a dynamic mesh network. This dynamic mesh network uses a single routing table for heterogeneous nodes contained within the mesh network.

Mesh Networks

The term "mesh network" is typically defined as a network comprised of two or more nodes wherein the nodes act as routers. Illustratively, an online encyclopedia from PC Magazine defines a mesh network as follows: "(1) [a] network that relies on all nodes to propagate signals. Although the wireless signal may start at some base station (access point) attached to a wired network, a wireless mesh network extends the transmission distance by relaying the signal from one computer to another . . . . (2) A network that provides Wi-Fi connectivity within an urban or suburban environment. It comprises 'mesh routers,' which are a combination base station (access point) and router in one device. Also called 'mesh nodes,' they are typically installed on street light poles, from which they obtain their power." PC Mag.com Encyclopedia, http://www.pcmag.com/encyclopedia/term/54776/wireless-mesh-network Similarly, another online source states: mesh "networks rely on a series of nodes that transfer data wirelessly. Each node acts as an individual router, so the network can constantly reroute data to take advantage of the best pathways. It allows information to 'hop' from one node to another, circumventing blocked or broken paths in the network. Unlike other wireless networks, mesh networks use nodes that are all fully connected to one another, so the nodes are not mobile, but they can be easily configured to form ad hoc networks." Power Source Online, *Mesh Networks*, Kristin Masters March 2010. http://www.powersourceonline.com/magazine/2010/03/mesh-networks As used in this application, we define the term "dynamic mesh node" as a mesh node that is capable of playing a dynamic role within a network. A dynamic role could mean, by way of example, being capable of being a client with respect to one node and a server with respect to another node in the network. Dynamic can also mean switching radio access technologies. Prior art mesh nodes did not have the ability to play a dynamic role within a network. Rather, as can be seen from the above two definitions, mesh nodes acted as a base station access point and router. These roles were predetermined. The nodes within the mesh networks did not dynamically function as a client to one node, and a server to another, nor did they dynamically change transmit frequencies or protocols, for example.

Multiple Radio Access Technology ("Multi-RAT") Nodes

The concept of multiple radio access technology will also be defined. The term "radio access technology" indicates the type of radio technology used to access a core network. Multiple radio access technology, or multi-RAT, is a radio technology capable of operating in varying parameters. These varying radio parameters could be, for example, different protocols, different duplexing schemes, wired versus wireless, disparate frequency bands, and the like.

By disparate frequency bands, we mean frequencies from different categories of standards, or from generally accepted frequency ranges for a given technology. For example, the Wi-Fi protocol standard is currently authorized for use at two different frequencies in the United States, 5 GHz according to the 802.1a standard and 2.4 GHz according to the 802.1b standard. However, the message format, media access method, etc. are identical regardless of the frequency used. Thus, in our lexicography, a device that could communicate using Wi-Fi at both 5 GHz and 2.4 GHz would not be a multi-RAT device or node because both of these frequencies are considered within the art to represent instances of the Wi-Fi protocol. An example of a radio capable of operating in disparate frequency bands would be a radio that could work in a Wi-Fi band of either 2.4 GHz or 5 GHz and that same radio could also operate at 700 MHz or any other cellular frequency band, which requires a different media access method and/or a different message format. This type of a radio is an example of a multi-RAT node.

Similarly, we use the term "heterogeneous mesh network" to mean at least two dynamic mesh nodes capable of: using different protocols, or different duplexing schemes, or operating in disparate frequency bands, or using different transmit/receive mediums, such as wired versus wireless. Different protocols may include Wi-Fi, 2G, 3G, 4G, WCDMA, LTE, LTE Advanced, ZigBee, or Bluetooth. Different duplexing schemes may include time division, code division, and frequency division schemes. Disparate frequency bands may include so-called "whitespace," VHF and UHF channels, cellular telephony bands, public safety bands, and the like.

The multi-RAT nodes of the present invention have hardware, firmware, and software aspects. Focusing first on the hardware aspects, FIG. 1 shows hardware that could be used in embodiments of this invention. In an embodiment, a multi-RAT node 100 is comprised of at least one processor 110, access hardware 120, backhaul hardware 130, an RF front-end 140, and a timing source 150. By way of example, the at least one processor 110 could contain firmware written in Linux. Additionally, the RF front-end 140 can be configured to provide RF capabilities for multiple radio access technologies.

In some embodiments, the timing source could be GPS. Alternatively, the timing source could be derived from the Ethernet, or an IEEE 1588 source, such as SyncE, PTP/1588v2, and the like. Alternatively, another timing source, or a combination of timing sources, could be used. The timing sources may be used as an input for triangulation, as well as for synchronizing base stations, or both, in some embodiments. In an alternate embodiment, wherein one multi-RAT node 100 may have access to GPS time, but another multi-RAT node 100 may be indoors, the two multi-RAT nodes 100 could use differential time synching techniques well known to those of skill in the art so that the indoor multi-RAT node 100 could sync its timing with that of the outdoor multi-RAT node 100. In another embodiment, the multi-RAT node 100 could be a dynamic multi-RAT node.

In alternate embodiments, the at least one processor 110, could be broken down into an access processor 112, a backhaul processor 114, a common processor 116, or any combination thereof. In this embodiment, the access hardware 120 is coupled to the at least one processor 110. In an alternate embodiment, having a separate access processor 112, the access hardware 120 could be coupled to the access processor 112, to the at least one processor 110, or to the common processor 116, or any combination thereof. Similarly, in another alternate embodiment, having a separate backhaul processor 114, the backhaul hardware 130 could be coupled to the backhaul processor 114, to the common processor 110, or to the common processor 116, or any combination thereof.

Those skilled in the art will appreciate that access and backhaul hardware will vary depending on the access or backhaul protocol or frequency being used to perform access or backhaul. By way of example, if a particular multi-RAT node 100 was designed to perform access on LTE and Wi-Fi, it could have the radio access technology components that would perform access on these two different protocols. For LTE access, the access hardware 120 could be comprised of: a baseband processor and CPU cores for the firmware. The baseband processor could generate digital RF signals, which are modulated by the RF front end 140. These processors could be connected to the RF front end 140 via common public radio interfaces. Alternatively, some or all of the necessary radio access technology may incorporate Commercial Off-the-Shelf (COTS) hardware/firmware devices, such as conventional Wi-Fi access hardware based on Atheros chips with embedded firmware and one or more external antennas. In some embodiments, any of the base stations described in U.S. patent application Ser. No. 14/183,176, entitled "Methods of Incorporating an Ad Hoc Cellular Network Into a Fixed Cellular Network," may be used.

Those skilled in the art will recognize that multiple hardware configurations could be used depending upon the access protocol, backhaul protocol, duplexing scheme, or operating frequency band by adding or replacing daughter cards to the dynamic multi-RAT node 100. Presently, there are off-the-shelf radio cards that can be used for the varying radio parameters. Accordingly, the multi-RAT nodes 100 of the present invention could be designed to contain as many radio cards as desired given the radio parameters of heterogeneous mesh networks within which the multi-RAT node 100 is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Similarly, in the present invention, we describe how to make and use the inventions operating within well-known industry protocols. To the extent that additional protocols are adopted in the future, the teachings herein would be equally applicable. Additionally, if a person of skill in the art were to modify an already known protocol, such as LTE, and make it into a proprietary LTE protocol, for example, the teachings of this patent application would be equally applicable; and embodiments described herein could be adapted to accommodate this proprietary protocol.

Self-Organizing Network "SON"

Those of skill in the art will recognize that the term "SON" is a frequently used concept, but one that is devoid of a standard way of implementing the principles of self-organization that the moniker implies. As a result, SON embodies principles of self-organization, typically performed by those skilled in the art using proprietary architecture. Given that there are no true heterogeneous mesh networks to date, SON functionality, naturally, is being implemented on homogeneous networks.

In the present invention, because most of the mesh networks described herein are heterogeneous, it follows naturally that any SON implementations would be able to operate in a heterogeneous network. Against this backdrop, we use the term "SON" throughout this application to mean the traditional functionality of SON, i.e., self-organization, self-optimization, auto-configuration, self-healing, and the like, applied on a heterogeneous network as that term is used throughout this patent application. The SON principles described herein could also be used on the white-space embodiments discussed infra.

Figure 2:
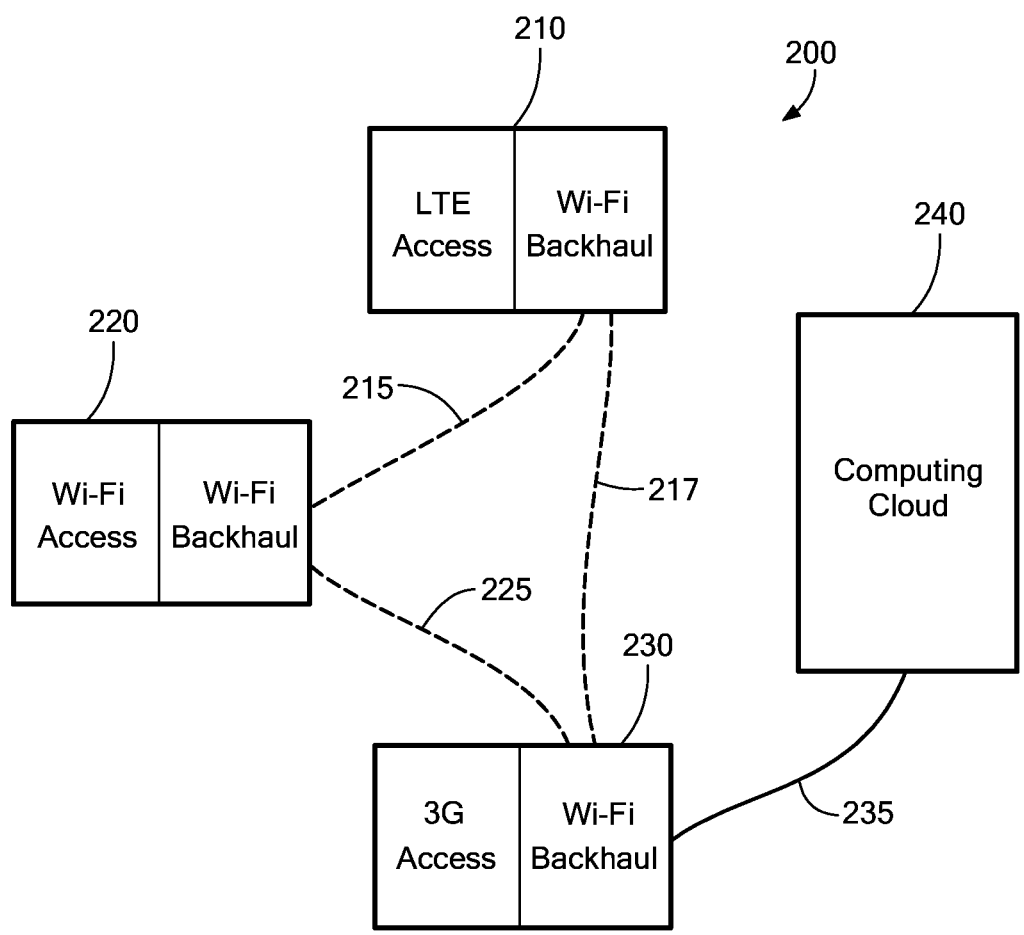
FIG. 2 is an illustration of an example heterogeneous mesh network of the present invention.

For illustrative purposes, we will describe SON functionality in an exemplary wireless mesh network 200 shown in FIG. 2. In this embodiment, multi-RAT node 210 is providing access on LTE, multi-RAT node 220 is providing access on Wi-Fi, and multi-RAT node 230 is providing access on 3G. In this embodiment, the multi-RAT nodes 210, 220, 230 could be using Wi-Fi backhaul. As such, this network 200 is a heterogeneous mesh network. In this heterogeneous mesh network, multi-RAT node 230 has a wired connection 235 to a computing cloud 240. Multi-RAT node 230 has a wireless connection 225 to multi-RAT node 220 and a wireless connection 217 to multi-RAT node 210. Additionally, multi-RAT node 220 has a wireless connection 215 to multi-RAT node 210. These connections are exemplary and could be altered in alternate embodiments. Additionally, heterogeneous mesh networks of the present invention could include more or less than the three exemplary multi-RAT nodes pictured in FIG. 2.

Figure 3:
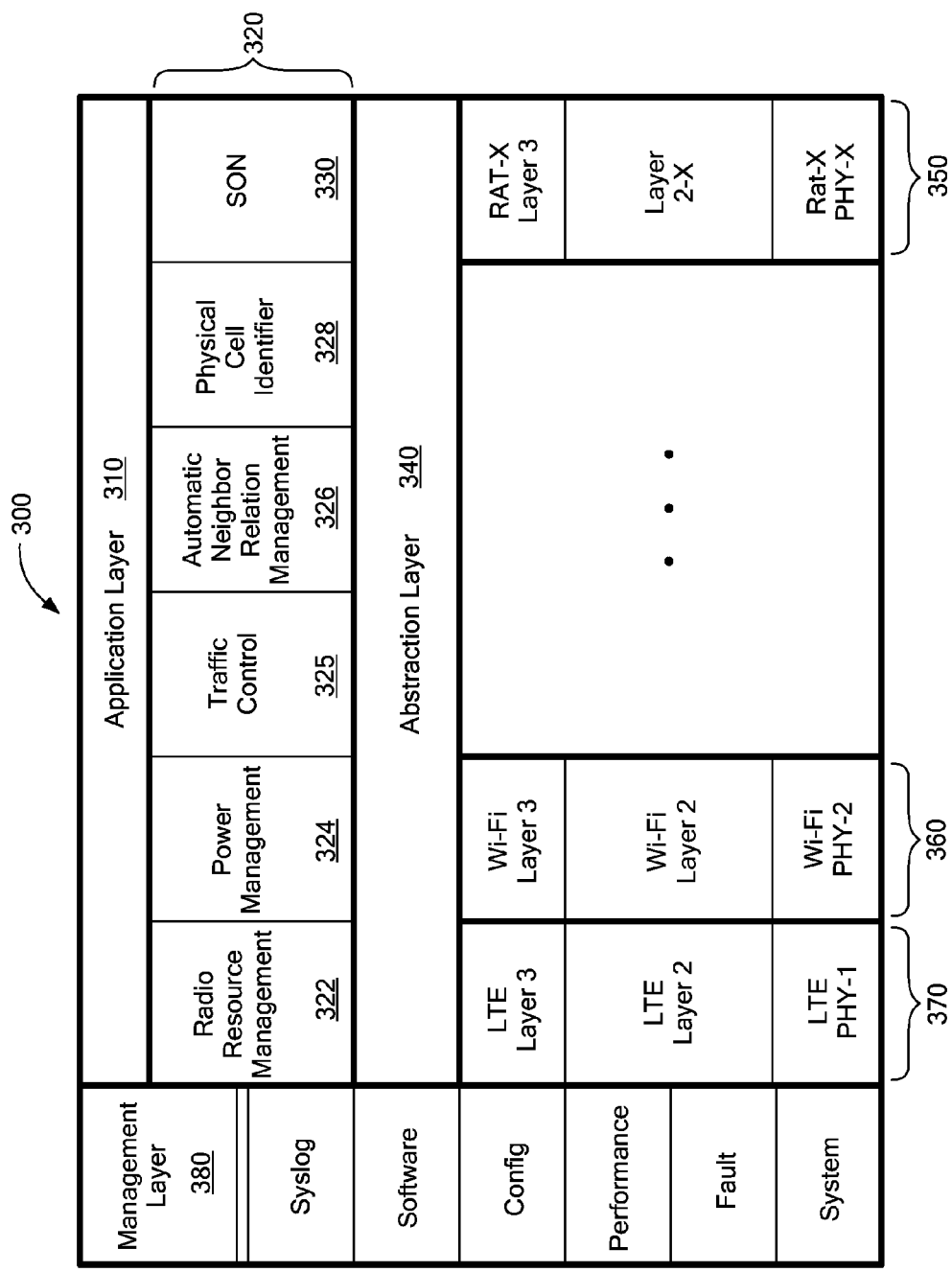
FIG. 3 is an illustration of the architecture of select layers of a device used within a mesh network described in various embodiments herein.

The SON architecture, discussed more fully with reference to FIG. 3, is distributed between a computing cloud 240 and the multi-RAT nodes 210, 220, 230. In one embodiment of SON functionality, the computing cloud 240 queries the multi-RAT nodes 210, 220, 230 regarding environmental conditions, e.g., interference, capacity, spectrum efficiency, routing path, network congestion, and the like. The multi-RAT nodes 210, 220, 230 respond by sending the requested parameters to the computing cloud 240. The computing cloud 240 processes these responses so that it can instruct the multi-RAT nodes 210, 220, 230 to change an operational parameter thereby better optimizing the performance of the heterogeneous mesh network 200. In these embodiments, operational parameters could be power level, channel, frequency band, spectrum reuse, as well as access, backhaul, client, or server, or routing paths.

In these embodiments, it is possible for a multi-RAT node 210, 220, or 230 to change an operational parameters because of the custom designed architecture 300 described infra. For illustrative purposes only, in one situation, the computing cloud 240 may determine that the heterogeneous mesh network 200 is experiencing interference. In response, the computing cloud 240 may instruct multi-RAT nodes 210 and 230 to reduce their power output.

In another embodiment, the multi-RAT nodes 210, 220, or 230 can also make decisions independent of the computing cloud 240 regarding whether to change an operational parameter because they also have custom designed architecture 300. In one of these embodiments, for example, the multi-RAT nodes 210, 220, or 230 could be pre-authorized to change channels if a certain interference threshold is crossed. Multi-RAT nodes could also contain the intelligence within their custom designed architecture 300 to be able to coordinate a handoff between them if one of their users is beginning to move into an area that would be better served by one of the other nodes in the network.

In another SON scenario, multi-RAT node 210 may be using its Wi-Fi radio for access and its LTE radio for backhaul. The computing cloud 240 may determine that multi-RAT node 210 is experiencing a backlog on the access side and that it could increase its efficiency by taking advantage of the greater downlink capacity built into the LTE standard. The computing cloud 240 could therefore instruct multi-RAT node 210 to dynamically switch roles, i.e., the LTE radio in multi-RAT node 210 should be used for backhaul and the Wi-Fi radio in multi-RAT node 210 should be used for access.

In similar embodiments, the computing cloud 240 could provide additional floating spectrum to one or more of the multi-RAT nodes 210, 220, or 230 to increase network capacity, to adhere to QoS requirement, to efficiently reuse spectrum, and the like.

In another embodiment, two multi-RAT nodes 210, 220, or 230 may be operating within close proximity to one another. For illustrative purposes, assume node 210 was servicing Verizon customers and node 220 was servicing AT&T customers. If multi-RAT node 210 reached a pre-determined capacity threshold, it could coordinate with multi-RAT node 220 to hand off some of its Verizon customers, who are operating in a different frequency band, to multi-RAT node 220. Multi-RAT node 220 could then provide service to customers of both Verizon and AT&T on two different frequency bands. Some of the criteria that could be used to determine if this type of frequency shifting among the multi-RAT nodes 210, 220, or 230 should occur are: (1) resource loads, e.g., DSP power, getting busy on one node; (2) one node may have better external resources, e.g., back-up power, wired backhaul, greater antenna height, optimum direction of antenna for a given coverage zone, and the like; and (3) similar key performance indicators that are well known in the art.

In this embodiment, once multi-RAT node 220 has been provisioned to provide services on two different frequencies, it must coordinate with multi-RAT node 210 by sharing information such as, traffic details, call details, RF quality measurements, and so forth. These nodes 210 and 220, which could be two or could be many, can add or remove frequency bands and can coordinate with each other to force user equipment handoffs to accommodate the change in the frequency scheme. In an alternate embodiment, the computing cloud 240 could manage the transfer of some Verizon customers to a multi-RAT node.

In another embodiment of this invention, a multi-RAT node 210, 220, or 230 may employ a method of increasing capacity by reducing its output power output thereby taking advantage of spectral reuse. In this embodiment, a multi-RAT node 210, for example, monitors its capacity. When it begins to reach a maximum capacity threshold, it could request permission from the computing cloud 240 to decrease its power output, thereby increasing capacity. Upon receiving this request, the computing cloud 240 could determine whether to grant the request. Some of the factors that the computing cloud 240 could take into consideration when making this determination are radio bearer utilization, QoS, operator policies, and capacity considerations of other multi-RAT nodes in the mesh network.

In this embodiment, once the computing cloud 240 reaches a decision regarding the request to decrease power, the computing cloud 240 informs the multi-RAT node 210 of its decision. If the request if granted, the computing cloud 240 directs the multi-RAT node 210 to prepare to handoff any UE sessions that will be in a coverage gap once it reduces its output power. Optionally, the multi-RAT node 210 could query UE on its network to obtain measurement reports of other multi-RAT nodes 220 or 230, for example, who may be able to absorb part of the coverage gap. In this embodiment, the multi-RAT node 210 could provide this information to the computing cloud 240.

Once the computing cloud 240 has directed the multi-RAT node 210 to prepare to handoff some UEs, it then directs one or more selected multi-RAT nodes 220 or 230 to increase its/their power, thereby increasing coverage. After the instructed multi-RAT node 220 or 230 has increased its power, it may update virtualization manager data with radio bearer capacity reduction information. The multi-RAT node 220 or 230 could then send the updated virtualization manager to computing cloud 240. After receiving this information, the computing cloud 240 virtualization manager may then direct the requesting multi-RAT node 210 to gracefully handoff in-progress UE sessions to other available multi-RAT nodes 220 or 230 in its neighborhood. Once the handoffs are completed, the requesting multi-RAT node 210 reduces its power to provide more capacity to UEs in its network. Optionally, this multi-RAT node 210 may update the virtualization manager with the resulting radio bearer capacity increase information and provide the updated virtualization manager to computing cloud 240.

In another embodiment of the present invention, a multi-RAT node 210, 220, or 230 in a mesh network may employ a method of increasing its coverage area by, for example, increasing power output. In this embodiment, a multi-RAT node 210 for example may monitor at least one network parameter and determine that a neighboring multi-RAT node 220 or 230 has ceased to function properly. After making this determination, the multi-RAT node 210 may contact the computing cloud 240 to report the malfunctioning multi-RAT node 220 or 230. The computing cloud 240 may then analyze the radio bearer utilization, QoS, operator policies and capacity considerations of other multi-RAT nodes 220 or 230 in the mesh. Using its measurements and internal logic, the computing cloud 240 could then determine if any of the multi-RAT nodes 220 or 230 within the mesh network can increase power output to provide more coverage.

In another embodiment, one of the multi-RAT nodes 210, 220, or 230 may, for example, be malfunctioning. In this embodiment, the computing cloud 240 could determine if one or more of the other multi-RAT nodes is able to fill the coverage gap caused by the malfunctioning node. The computing cloud 240 could coordinate with the functioning multi-RAT nodes so that at least one of them increases power, thereby extending coverage. After the coverage area has been extended, the multi-RAT nodes 210, 220, or 230 may update the virtualization manager with the resulting radio bearer capacity reduction information. Additionally, in this embodiment, the multi-RAT node(s) 210, 220, or 230 may have to handoff UE sessions in progress gracefully to other neighboring multi-RAT nodes in order to effectively extend coverage.

In alternate embodiments of this method, multi-RAT nodes may 210, 220, or 230 dynamically increase the transmit power of a single sector or multiple sector radio bearer based, for example, on Signal-to-Noise Ratio (SNR) reports and/or location determination. This power adjustment may be performed in coordination with neighboring multi-RAT nodes, who correspondingly decrease their transmit power of the single sector or multiple sector radio bearer. A multi-RAT node 210, 220, or 230 may perform this functionality by directly communicating with neighboring multi-RAT nodes or in coordination with the computing cloud 240.

In an alternate embodiment, the multi-RAT nodes 210, 220, and 230 could operate on white-space frequencies. As those of skill in the art will recognize, using white-space frequencies for communication requires flexibility in terms of pre-selecting an operational frequency so as to avoid interference with other white-space devices. Because the white-space spectrum is unlicensed, it must be shared among potential users. In this embodiment, the multi-RAT nodes 210, 220, and 230 could use spectrum sensing techniques to determine which portion of the white-space spectrum is available for use. In an alternate embodiment, the multi-RAT nodes 220, 220, and 230 could query a database containing frequency availability based on location, time, and the like. This database could be stored within any or all of the multi-RAT nodes 210, 220, and 230, in the computing cloud 240, or in a remote location.

FIG. 3 shows a custom designed architecture 300 that can be used in embodiments of the heterogeneous mesh networks of this invention. Specifically, the custom designed architecture 300 of these embodiments builds upon the well-known Layer 1, Layer 2, Layer 3, Control Layer, Application Layer, and Management Layer architecture of the prior art.

In our custom designed architecture 300, we add an abstraction layer 340, a SON module 330, and in addition add customizations to the other modules so that they can interoperate with the abstraction layer 340 and the SON module 330. Specifically, our custom designed architecture 300 includes a management layer 380, an application layer 310, a control layer 320, and an abstraction layer 340. The abstraction layer 340 is communicatively coupled to at least one radio. For example, the embodiment of FIG. 3 shows three multi access technology radios. One of these radios is an LTE radio 370. One is a Wi-Fi radio 360. And the third is radio technology X 350. Once there are at least two radio access technologies within a single node, the node becomes a multi-RAT node as described herein. As can be seen from FIG. 3, additional radios 350 could be added to create multi-RAT nodes having X number of access technologies.

The abstraction layer 340 provides a common API interface to the layers above it. The abstraction layer 340 receives data from each of the radios beneath it and converts those data into protocol agnostic data. In some embodiments of the present invention, the SON module 330 interfaces with the SON portion of a computing cloud 240 in order to perform network optimization.

In terms of customization of the modules within the control layer 320, the traffic control module 325 has the flexibility to create data queues based on priority without regard to radio access technology. The automatic neighbor relation management module 326 acts as an interface between the multiple radio access technologies so that neighbors within a particular mesh network become aware of the various resources provided by each node within the network.

In some embodiments, the power management module 324 and/or the radio resource management module 322 can interface with the SON module 330 to increase or decrease power, to change channels, and the like in order to optimize network operating conditions.

For illustration, assume that the custom designed architecture 300 was operational on a multi-RAT node having two radio technologies, LTE 370 and Wi-Fi 360. In this embodiment, data could be received through the LTE radio 370. These data would be received in Layer 1 of the LTE radio 370. They would proceed up through Layer 2 and Layer 3 to the abstraction layer 340. The abstraction layer 340 would abstract the LTE-specific information from the data packet and would send a protocol agnostic data stream to the control layer 320. The control layer 320 would then decide the routing, which in this case could be through either the LTE radio 370 or the Wi-Fi radio 360. In embodiments of the present invention, multi-RAT nodes use and create distributed routing protocols that perform L2 bridging through an abstraction layer.

Additional embodiments of the present invention include novel routing protocols. In the prior art, routing was coupled to a specific operational parameter, e.g., protocol, duplexing scheme, wired versus wireless, or frequency band. In the present invention, routing is not tethered to these operational parameters because multi-RAT nodes participate within a mesh network with disparate operational parameters. The abstraction layer 340, in essence, creates agnostic data packets that can be routed through any of the multi-RAT nodes within a given heterogeneous mesh network.

In prior art mesh networks, nodes typically connected to adjacent peers. Referring to FIG. 2, adjacent peers could be 210 and 220, connected wireless via 215, and 220 and 230, connected wirelessly via 225. In embodiments of this invention, the nodes within a heterogeneous mesh network can have multiple connections such as multi-RAT node 230, which can connect to multi-RAT node 210 via connection pathways 225 and 215 or via connection pathway 217. In alternate embodiments of a heterogeneous mesh network, there could be more than three nodes as pictured in FIG. 2. In these embodiments, nodes that have multiple backhaul connections, e.g., multi-RAT node 230, could make dynamic decisions about the most effective connection paths for it to use at any given time. These decisions could be based on any of the environmental conditions discussed herein including, but not limited to interference, capacity, spectrum efficiency, routing path, network congestion, spectral reuse, throughput, latency, coverage gaps, signal-to-noise ratio, quality-of-service, spectral sensing for white space use, and the like.

In additional embodiments, this invention allows the creation of unique routing protocols, in part because of the agnostic nature of the data. These routing protocols can facilitate distributed computation of network topology and/or path determination. Specifically, when agnostic data are routed within the networks created herein, it is possible to use the transmission capabilities of the multi access radio technologies for data generated from, or destined to, a wide variety of radio communication protocols, frequencies, duplexing schemes, and the like.

Figure 4:
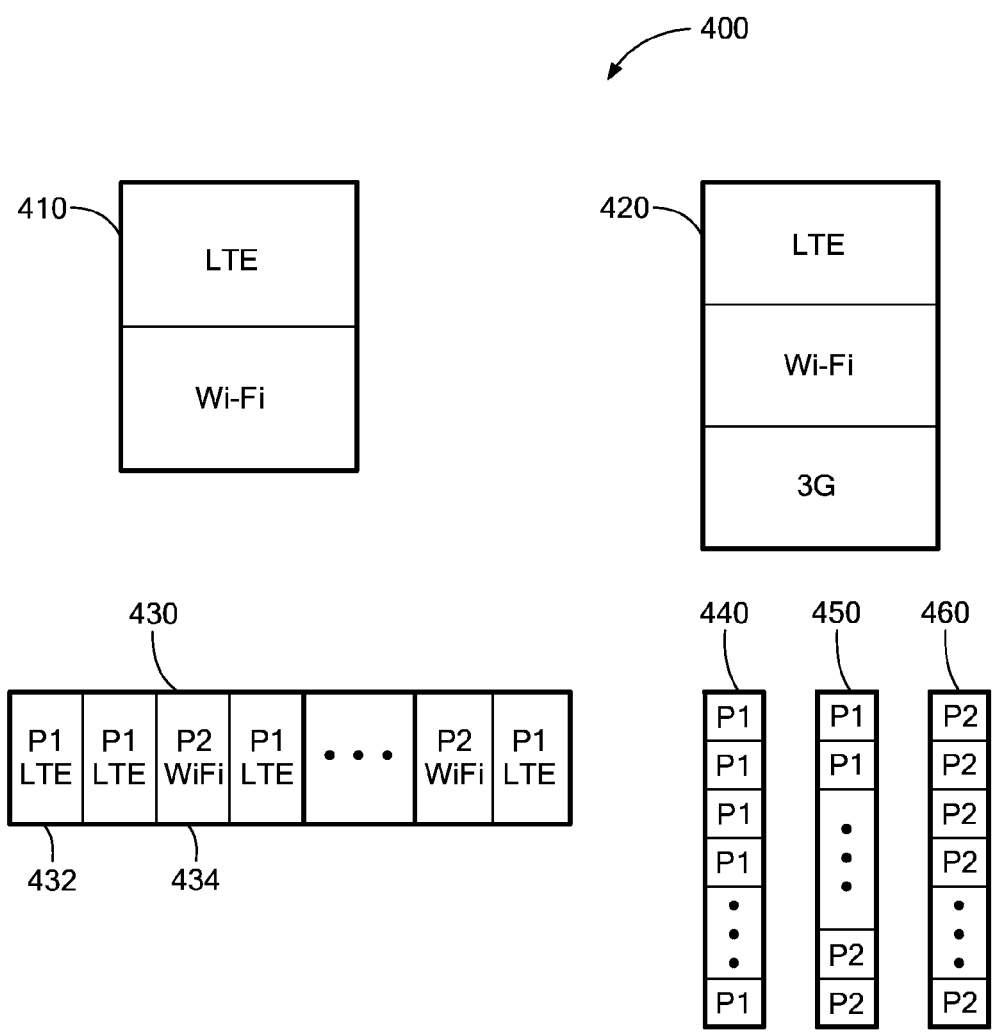
FIG. 4 illustrates examples of routing protocols that can be used in various embodiments described herein.

FIG. 4 illustrates the concept of the mesh routing protocols in these embodiments. FIG. 4 depicts two multi-RAT nodes 410 and 420. In this exemplary embodiment, multi-RAT node 410 can operate on LTE and Wi-Fi, while multi-RAT node 420 operates over LTE, Wi-Fi, and 3G. When the multi-RAT nodes 410 and 420 exchange the mesh routing protocols, multi-RAT node 410 may place LTE data as priority 1 and Wi-Fi data as priority 2.

For purposes of illustration, we assume that, according to the current mesh routing table, multi-RAT node 420 acts as a relay node for multi-RAT node 410. In this example, multi-RAT node 410 transmits a data stream 430 containing data packets having different radio parameters. For example, data packets could be priority 1 data packets 432, LTE in this example, and priority 2 data packets 434, Wi-Fi in this example. When this data stream 430 is received at multi-RAT node 420, the packets within the data stream 420 retain their priority, but they are agnostic in terms of their radio parameters.

In a traditional mesh network, all of the multi-RAT nodes would have had the same radio parameters. Accordingly, when a routing node received a data stream, it would retransmit the packets on the same radio type as that of its neighbor, who originally transmitted the data packet. In the heterogeneous mesh network of the present invention, the multi-RAT nodes contained therein are capable of transmitting and receiving in a heterogeneous fashion. As such, multi-RAT node 420 can relay these data packets on any of its three available radio technologies, i.e., LTE, Wi-Fi, or 3G.

In this embodiment, a traffic control module 325 receives these data packets and provides a priority indicator to each of the packets within the data stream 430. The SON module 330 stored within multi-RAT node 420, or in alternate embodiments stored within the computing cloud 240, could queue these data packets to be retransmitted according to the priority that has been ascribed to each specific data packet. Specifically, when multi-RAT node 420 receives data stream 430, it can utilize all three of its radio access technologies for retransmitting the data stream 430. In one embodiment, multi-RAT node 420 could use its LTE radio transmit channel 440 for transmitting priority 1 data packets. It could use its 3G radio transmit channel 460 for transmitting priority 2 data packets. And it could divide the resources available from its Wi-Fi radio transmit channel 450 to transmit both priority 1 and priority 2 data packets.

This allocation of resources is fluid and is a function of time and network congestion, which is an environmental condition. If at a later point in time, priority 1 data packets became backlogged, the SON module 330 could alter an operational parameter such as using the 3G radio transmit channel 460 to transmit priority 1 data and maintaining the Wi-Fi transmit channel 450 as a shared resource for transmitting both priority 1 and priority 2 data.

Person Locator

This invention uses a multi-RAT node as a tool for locating an individual. This feature could be part of a search and rescue mission, a tracking tool, a personnel monitoring system, or another such tool used for locating an individual. In one embodiment, we disclose a method for locating an individual comprising using a mobile multi-RAT node within close proximity to the last known location of the individual, wherein the multi-RAT node includes a directional antenna having a narrow beamwidth. If the individual has a UE, it will try to attach to the mobile multi-RAT node. Once the mobile multi-RAT node receives a signal from the UE, it will know where the individual is located because of the narrow beamwidth. In this embodiment, we propose using beam-forming techniques to obtain better in-building penetration when looking for an individual lost inside of a structure.

In an additional embodiment, the multi-RAT node can also be configured to provide Wi-Fi service, much like a Wi-Fi hot spot. In this embodiment, the multi-RAT node could be configured to look like any number of popular Wi-Fi hot spots to enhance the likelihood that the individual's UE will recognize the hot spot and attempt to connect to the hot spot. Examples of popular Wi-Fi hot spots could be: Starbucks, LinkSys, Barnes & Noble, a local airport, and the like. This feature could be used to locate someone as follows. If the person being sought had previously logged onto, for example, a Starbuck's Wi-Fi hot spot, his/her phone would automatically seek to establish a Wi-Fi connection with the known SSID for Starbucks.

A multi-RAT node in this embodiment could cycle through the 50 most popular Wi-Fi SSID's to increase the odds that a UE will establish a connection between itself and the multi-RAT node. In the search and rescue scenario, the rescue team would be alerted that their person of interest may have been found once the connection is made. The search and rescue team could ping the UE for GPS location information or could use narrow-beam techniques to hone in on the lost individual.

In a variation of this embodiment, a single multi-RAT node could be used to perform triangulation if GPS location was not available. In this embodiment, the multi-RAT node could be a mobile multi-RAT node. It could triangulate the UE's location, and therefore the location of the lost person, by moving to three geometrically advantageous points. Using time and distance measurements from these three geometrically strategic locations, the rescue team could use triangulation techniques to locate the lost person. Optionally, a SON module could be used to provide visual or audible input to personnel located near the mobile multi-RAT node wherein the input directs the personnel to three geometrically strategic locations for obtaining triangulation data.

In an alternate embodiment, a SON module located in a multi-RAT node or in a computing cloud could use neighbor reports from other UEs, distance reports from other small or macro cells, and so forth to perform triangulation that would lead to locating the person-of-interest.

In an embodiment used for mission-mapping, first responder's UEs could be tracked and mapped during various missions. These tracking data could be integrated into a cloud computing server that could dynamically oversee environmental conditions of the network and make changes to operational parameters to optimize system performance.

These mapping data could be multicast to team member's in-vehicle displays or hand-held displays such as on a smart phone. In addition, mapping data could be transmitted to a central location such as headquarters or dispatch to facilitate overall mission planning. Optionally, an alarm could be sent to team members if a particular first responder stopped moving, or deviated off course indicating perhaps an injury or hostage situation.

In an additional embodiment, the multi-RAT node could include a wideband feature wherein it circulates through providing access on different network operator's systems. For example, the multi-RAT node could be an AT&T eNodeB first, and then after a predetermined amount of time, it could reconfigure itself, using its internal logic and the multiple radios it has at its disposal, to a Verizon eNodeB, and then to Sprint, and then T-Mobile, and then EE, or other international network operators if there was reason to believe the lost individual was from outside of the U.S.

In these embodiments, once an individual is detected, the multi-RAT node could send a pre-recorded message via phone or text to the lost person. It could alternatively connect a call between the lost individual and rescue personnel or send an LTE signal report to rescue personnel. In this way, it would be possible to quickly find the individual and to obtain additional information about their condition, whether they are alone or with others, the condition of their surroundings, and so forth.

Figure 5:
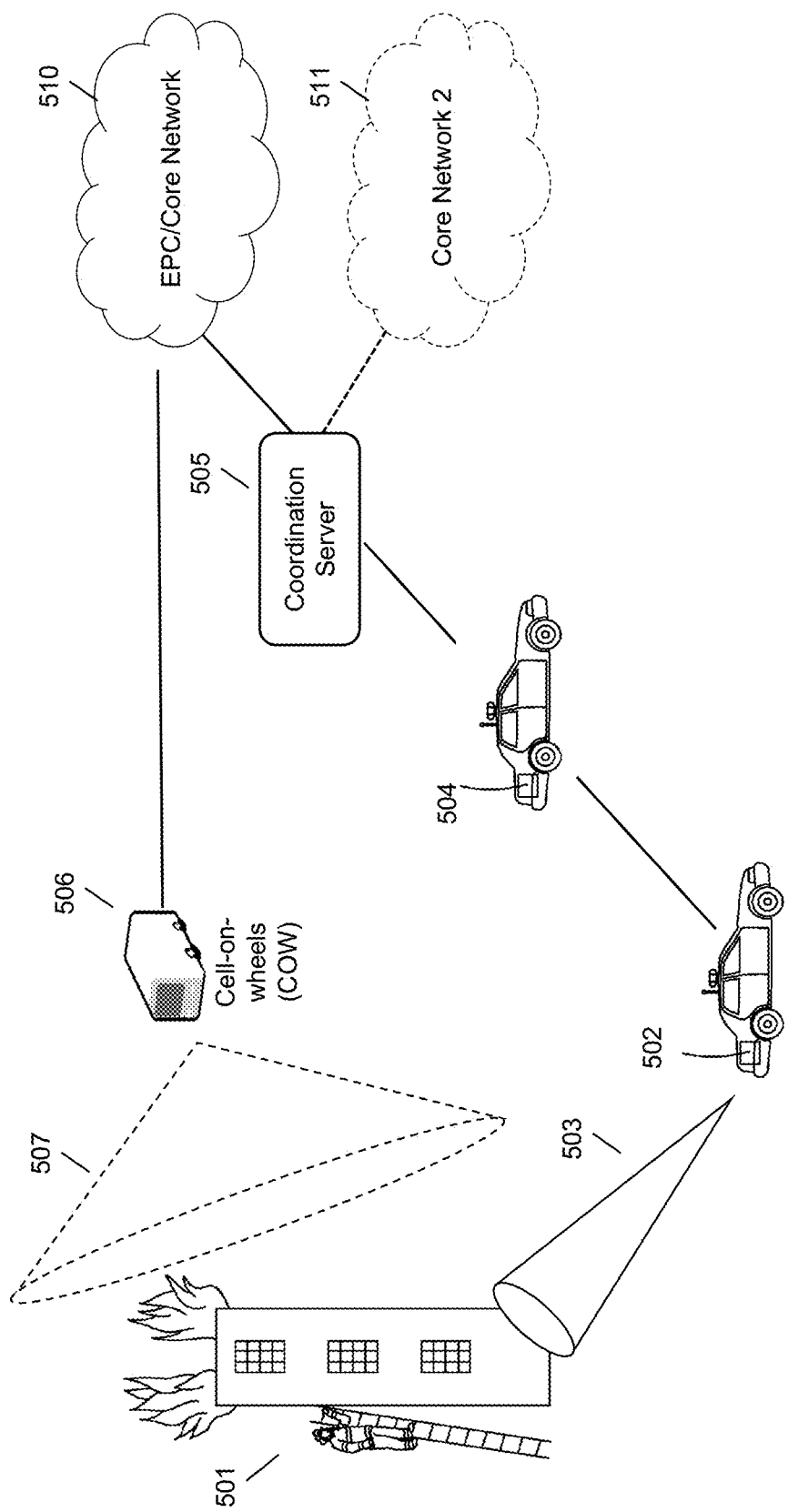
FIG. 5 is a schematic diagram of a multi-RAT base station person locator system, in accordance with some embodiments.

FIG. 5 is a schematic diagram of a multi-RAT base station person locator system, in accordance with some embodiments. Building 501 is depicted as being in a disaster scenario, e.g., a burning building in the diagram. An emergency responder has reached the building and is attempting to rescue any persons still located in the building.

A typical cell-on-wheels deployable, as known in the art, is also depicted as COW 506. COW 506 provides wireless access with a wide angle of coverage 507 to any UEs in building 501. Although coverage is provided to all UEs in the building, the power of the signal provided by COW 506 is undirected, and therefore does not penetrate far into the building. COW 506 also does not have a directional antenna and is not able to identify the location of a UE inside the building. COW 306 also does not have the ability to connect to more than one core network.

By contrast, in-vehicle eNodeB 503 uses a directional antenna to scan the building for UEs. In-vehicle eNodeB 503 connects to another in-vehicle eNodeB 504 for a wireless backhaul connection. In vehicle eNodeBs 502 and 504 may be multi-RAT base stations, and may use a direct Wi-Fi connection to create a mesh network between the two nodes. In-vehicle eNodeB 504 connects to a coordination server 505, which provides a connection to EPC/core network 510. As well, the coordination server allows the connection of eNodeBs 502 and 504 to other core network 511, for example by virtualizing eNodeBs 502 and 504 toward the core networks, and by virtualizing the core networks toward the eNodeBs. A mini-EPC may be located at in-vehicle eNodeB 502, for authenticating UEs that may be configured to operate on one or more operator networks, e.g., Sprint, Verizon, or a public safety network.

Figure 6:
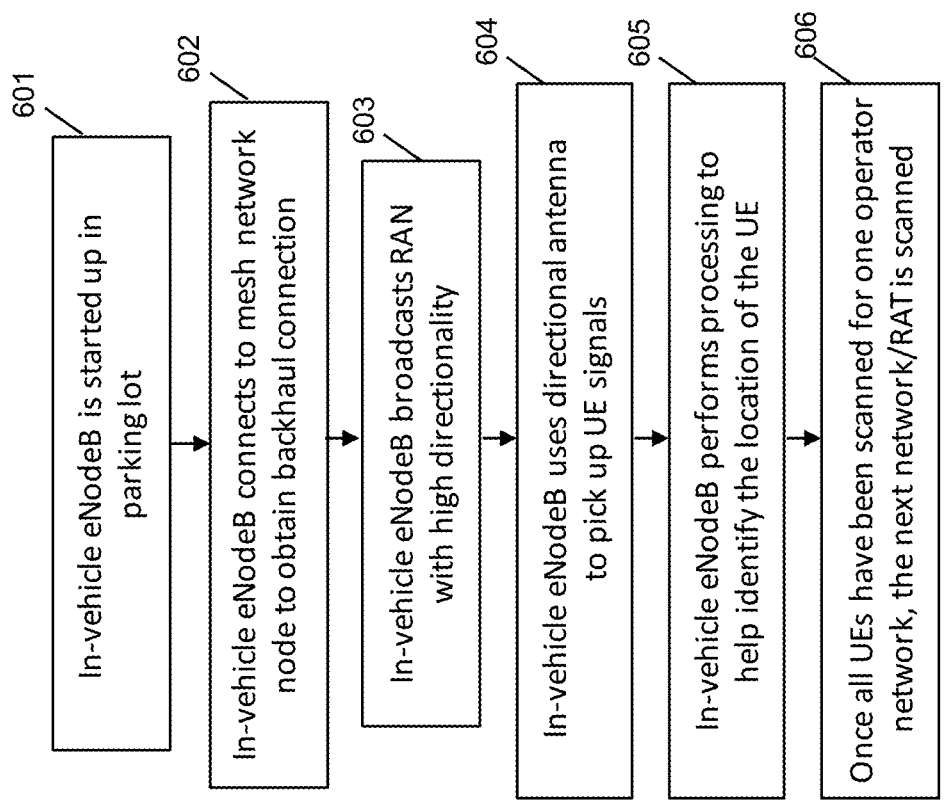
FIG. 6 is a flowchart of a method for locating a person using an in-vehicle eNodeB with directional antenna, in accordance with some embodiments.

FIG. 6 is a flowchart of a method for locating a person using an in-vehicle eNodeB with directional antenna, in accordance with some embodiments. In the event that a person locator service is needed, for example, immediately following the collapse of a building, a mobile base station, which may be an in-vehicle eNodeB, and which also may have a multi-RAT functionality, may be used as follows. In the following disclosure, where a collapsed building is described below, it is understood that the methods described herein could be applied to various different scenarios, including fire, explosion, hostage, other disaster or emergency, or another scenario requiring locating individuals by their mobile phones.

At step 601, an in-vehicle eNodeB is started up in a parking lot. The in-vehicle eNodeB may be configured to provide wireless access to individual user equipments (UEs, i.e., cell phones) using a first radio access network technology (RAT). At step 602, the in-vehicle eNodeB may use a second radio access technology to connect to another mesh network node to obtain a backhaul connection, such as by setting up a Wi-Fi connection to the other mesh network node.

At step 603, the in-vehicle eNodeB may broadcast a radio access network (RAN), for connecting with UEs. The access network may be transmitted and received using a directional antenna, and may be directed toward the collapsed building. The directional antenna may have a narrow beamwidth. At step 604, the in-vehicle eNodeB may use the directional antenna to receive signals from UEs. Due to the directional nature of the antenna, UEs that are within the narrow coverage area of the antenna may be able to be detected, even if the power level of the UE transmission is low.

At step 604, the in-vehicle eNodeB uses its directional antenna to pick up UE signals. In some embodiments, the directional antenna may have a narrow beamwidth. When the signal is pointed at a particular UE, the UE attempts to attach to the eNodeB, allowing the eNodeB to track the individual UE. At step 605, the in-vehicle eNodeB may attempt to identify the location of the UE whose signal is identified. In some embodiments, the in-vehicle eNodeB may include a processor module that may be used to identify the location of the UE signal. The processor module may use a variety of methods for identifying the location of the UE signal.

The directional antenna of the in-vehicle eNodeB may be directed at each part of the collapsed building, to discover any UEs that are in the collapsed building. Then, at step 606, once all UEs have been scanned for one operator network, the network and/or radio access network may be scanned. The in-vehicle eNodeB may be reconfigured to operate on another wireless operator's network, including being reconfigured to operate on a different frequency band. The in-vehicle eNodeB may be reconfigured to operate using one or more Wi-Fi SSIDs. In some embodiments, more than one operator network at one time may be broadcast by the in-vehicle eNodeB. In some embodiments, multiple wireless networks or operator networks may be searched at the same time by one or multiple eNodeBs.

In a method embodiment of the present invention, a multi-RAT node could be used to locate an individual. In this method, the multi-RAT node could be mobile. It could be used in close proximity to where the individual is believed to be lost or trapped. The multi-RAT node could be carried by rescue personnel, a helicopter, a drone, boat, an ATV, a vehicle, and the like. Once the multi-RAT node was within range of where the lost or trapped individual was believed to be, it could be powered up and used to scan the area in the hope that the individual's UE would sense a base station and try to connect to that base station.

If the individual was within range of the multi-RAT node and she/he still had battery left in his/her UE, the UE would try to connect to the multi-RAT node. This is especially true because the multi-RAT nodes described herein are capable of use with a wide variety of frequencies and protocols. Once the individual's UE attempts to connect to the multi-RAT node, the multi-RAT node can use the signal from the UE to determine the location of the individual. The location could be determined using GPS within the UE if GPS is available or by using ranging techniques well known in the art.

In an additional embodiment, the multi-RAT node can measure network signal strength. Because the multi-RAT node is a multi-radio technology node, it can measure signal strength of multiple radio technologies. These measurements can be used to determine whose networks are operational and the operational condition of these networks, e.g., 10% operational within X cell sector, 30% operational in Y cell sector, and so forth.

Those of skill in the art will recognize that these radio resources could be used numerous different ways depending open things such as Quality of Service requirements including constraints on throughput and/or delay, subscriber agreements, network capacity, data congestion, efficient use of spectrum, and the like. Moreover, routing decisions could be made based upon environmental conditions such as: interference, capacity, spectrum efficiency, routing path, network congestion, spectral reuse, throughput, latency, coverage gaps, signal-to-noise ratio, quality-of-service, spectral sensing for white space use, and the like. Skilled artisans will also recognize that these decisions could be made by multi-RAT nodes, the computing cloud, or jointly between these devices.

The foregoing discussion discloses and describes merely exemplary embodiments of the present invention. As will be understood by those skilled in the art, the present invention may be embodied in other specific forms without departing from the spirit or essential characteristics thereof. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

What is claimed is:

1. A system for facilitating search and rescue operations, comprising:
    a first multi-radio access technology (RAT) base station for connecting with and providing network access to a mobile device, the first multi-RAT base station further comprising a timing source producing a timing signal;
    a first directional antenna coupled to the first multi-RAT base station;
    a processor configured to compute a location of the mobile device based on a response received from the mobile device at the first directional antenna and based on a direction and a beamwidth of the first directional antenna at a time the response is received, and to perform a triangulation operation to compute the location of the mobile device based on the timing signal;
    a mini-evolved packet core (EPC) for collecting a user identifier of the mobile device and for authenticating the mobile device with the user identifier at the first multi-RAT base station; and
    a second multi-RAT base station connected to the operator network for providing a backhaul connection to the first multi-RAT base station via a mesh network connection with the first multi-RAT base station, wherein the first multi-RAT base station is configured to use the first directional antenna to scan a designated area for mobile devices and to thereby identify locations of a plurality of mobile devices within the designated area, and wherein the second multi-RAT base station is configured to obtain the timing signal from the first multi-RAT base station.

2. The system of claim 1, wherein the first multi-RAT base station is mobile and is positioned based on a last known position of an individual.

3. The system of claim 1, wherein the first directional antenna is configured to perform beamforming.

4. A system for facilitating search and rescue operations, comprising:
- a first multi-radio access technology (RAT) base station for connecting with and providing network access to a mobile device, the first multi-RAT base station further comprising a timing source producing a timing signal and a television white space (TVWS) radio access module;
- a first directional antenna coupled to the first multi-RAT base station;
- a processor configured to compute a location of the mobile device based on a response received from the mobile device at the first directional antenna and based on a direction and a beamwidth of the first directional antenna at a time the response is received, and to perform a triangulation operation to compute the location of the mobile device based on the timing signal;
- a mini-evolved packet core (EPC) for collecting a user identifier of the mobile device and for authenticating the mobile device with the user identifier at the first multi-RAT base station; and
- a second multi-RAT base station connected to the operator network for providing a backhaul connection to the first multi-RAT base station via a mesh network connection with the first multi-RAT base station,
- wherein the first multi-RAT base station is configured to use the first directional antenna to scan a designated area for mobile devices and to thereby identify locations of a plurality of mobile devices within the designated area.

5. The system of claim 1, wherein the first and the second multi-RAT base station are reconfigurable to operate on multiple operator networks.

6. The system of claim 1, wherein the first multi-RAT base station is configured to solicit a global positioning system (GPS) location from the mobile device once the response is received from the mobile device.

7. The system of claim 1, wherein the first multi-RAT base station is configured to send a pre-recorded message to the mobile device once the response is received from the mobile device.

8. The system of claim 1, wherein one of the first and the second multi-RAT base station performs measurement of signal strength of a plurality of radio networks at a particular location using at least two radio access technologies.

9. A system for facilitating search and rescue operations, comprising:
- a first multi-radio access technology (RAT) base station for connecting with and providing network access to a mobile device, the first multi-RAT base station further comprising a timing source producing a timing signal;
- a first directional antenna coupled to the first multi-RAT base station;
- a processor configured to compute a location of the mobile device based on a response received from the mobile device at the first directional antenna and based on a direction and a beamwidth of the first directional antenna at a time the response is received, and to perform a triangulation operation to compute the location of the mobile device based on the timing signal;
- a mini-evolved packet core (EPC) for collecting a user identifier of the mobile device and for authenticating the mobile device with the user identifier at the first multi-RAT base station;
- a second multi-RAT base station connected to the operator network for providing a backhaul connection to the first multi-RAT base station via a mesh network connection with the first multi-RAT base station; and
- a third multi-RAT base station,
- wherein the first multi-RAT base station is configured to use the first directional antenna to scan a designated area for mobile devices and to thereby identify locations of a plurality of mobile devices within the designated area, and
- wherein the second and third multi-RAT bas stations are configured to differentially synchronize a second and a third timing signal with the first multi-RAT base station.

10. The system of claim 1, wherein the timing source is one of a global positioning system (GPS) or an IEEE 1588 timing source.

11. The system of claim 1, wherein the processor is configured to perform a triangulation operation based on a plurality of timing signals from a plurality of multi-RAT nodes.

12. The system of claim 1, wherein the first multi-RAT base station is configured to provide access to communications services to rescuers on a search-and-rescue communications band.

13. The system of claim 1, wherein the first multi-RAT base station is configured to focus transmit power in the direction of the first directional antenna.

* * * * *